United States Patent [19]
Draznin et al.

[11] Patent Number: 5,294,079
[45] Date of Patent: Mar. 15, 1994

[54] SPACE TRANSFER VEHICLE

[75] Inventors: Michael E. Draznin, Long Beach; Roy K. Tsugawa, Gardena, both of Calif.

[73] Assignee: TRW Inc., Redondo Beach, Calif.

[21] Appl. No.: 861,675

[22] Filed: Apr. 1, 1992

[51] Int. Cl.$^5$ .............................................. B64G 1/26
[52] U.S. Cl. ...................................... 244/169; 244/164
[58] Field of Search ............... 244/164, 169, 172, 3.22

[56] References Cited

U.S. PATENT DOCUMENTS

| | | | |
|---|---|---|---|
| 2,974,594 | 3/1961 | Boehm | 244/169 |
| 3,471,106 | 10/1969 | Maes | 244/169 |
| 3,532,297 | 10/1970 | Maes | 244/169 |
| 3,612,442 | 10/1971 | Chisel | 244/3.22 |
| 3,802,190 | 4/1974 | Kaufmann | 244/3.22 |
| 3,866,025 | 2/1975 | Cavanagh | 244/169 |
| 4,635,885 | 1/1987 | Hujsak | 244/172 |
| 4,667,907 | 5/1987 | Hujsak et al. | 244/172 |
| 4,726,544 | 2/1988 | Unterstein | 244/3.22 |
| 4,852,827 | 8/1989 | Kranz | 244/3.22 |
| 4,958,788 | 9/1990 | Namera et al. | 244/169 |
| 5,062,593 | 11/1991 | Goddard et al. | 244/172 |
| 5,130,931 | 7/1992 | Paluszek et al. | 244/164 |

Primary Examiner—Michael S. Huppert
Assistant Examiner—Anne E. Bidwell
Attorney, Agent, or Firm—Sol. L. Goldstein

[57] ABSTRACT

A space transfer vehicle has a plurality of thrusters for maneuvering in six degrees of freedom about three orthogonal vehicle axes. The space transfer vehicle includes four box-like thruster modules which each house an identically arranged plurality of thrusters. The thrusters are selectively energized in pairs to produce torque about the three orthogonal axes with a first magnitude for maneuvering the space transfer vehicle without a payload, and of a second magnitude for maneuvering the space transfer vehicle with a payload.

19 Claims, 3 Drawing Sheets

SPACE TRANSFER VEHICLE

BACKGROUND AND SUMMARY OF THE INVENTION

The present invention in general relates to a space transfer vehicle ("STV"), and more particularly, relates to a STV having a thruster configuration suitable for maneuvering the vehicle alone or in combination with a payload.

STVs are spacecraft that are launched into orbit in outer space for the purpose of servicing other spacecraft (hereinafter referred to as payloads). In other words, the STV functions as a space tug. The STV are designed to rendezvous, dock and maneuver with and without payloads. This necessitates the ability to execute six degrees of freedom (6 DOF) maneuvers within specific rotational and translational acceleration constraints. This maneuvering is accomplished by the reaction control system, using thruster rocket engines to provide the necessary force. The thruster rockets typically provide a fixed thrust that translates the STV and/or produces rotational torque, based on their size, orientation, and placement with respect to the center of gravity of the vehicle alone or in combination with a payload.

The STV includes a conventional guidance, navigation and control system which has specific operating limits of maximum and minimum translational and rotational acceleration. The lower limit on acceleration is typically 0.01 ft/s$^2$ for translation and 0.01 deg./s$^2$ for rotation, while the upper limits on acceleration are 1.0 ft/s$^2$ for translation and 1.0 deg./s$^2$ for acceleration. In order to guarantee stability of the STV, maneuvering must be accomplished within these constraints, both with and without a payload attached to the STV.

FIG. 1 is a prior art isometric sketch of the nominal thruster configuration for a STV which is currently the standard configuration in the industry.

In this configuration, six degree of freedom maneuvering of the STV without a payload is provided by incorporating thruster sets positioned at the ends of the vehicle in order to bracket the vehicle center of gravity. In this simplest scenario, translation is accomplished by firing balanced pairs of thrusters, that do not produce any torques or translation other than that desired. Rotation is provided by firing thrusters on opposite sides of the vehicle to provide a pure torque couple. Given the fixed geometry of the vehicle, the thruster size is varied to yield accelerations within the limits of the guidance, navigation and control system. As a practical matter, the minimum acceleration limit is experienced at the beginning of the mission when the STV is fully loaded with propellant. Conversely, the maximum acceleration is experienced when the STV is almost depleted of propellant. In the nominal configuration, a minimum of 24 thrusters is required for 6 DOF maneuvering.

In FIG. 1, as well as the other figures, bold faced arrows are used to represent the thrusters and show the direction of force produced by the thruster. A circle with a dot in its center indicates a thruster having a direction of force produced by the thruster directly out of the page. Thus, each such vector is aligned with an axis called the "thruster axis" or "reaction line of thrust".

In FIG. 1, the three visible faces of the isometric sketch are drawn to include the thruster axes for the prior art nominal configuration. Each of the three faces not visible includes thrusters mounted to produce thruster axes identical to its respective opposite face. Accordingly, a thruster is mounted in each corner of each face to generate a reaction line of thrust perpendicular to the face. Two additional thrusters are mounted in a canted position as shown on both the +Z and −Z faces.

The difficulty with known vehicles used to perform the functions is that the thrusters had no relevancy to the control system or the range of tasks to be carried out. If the thrusters are too big, they will rotate or accelerate the STV more quickly than the control system can accommodate. If a thruster size is chosen which is capable of maneuvering the vehicle by itself within the control system constraints, the thrusters turn out to be too small once a large payload is attached. This nominal thruster configuration of the prior art cannot easily or inexpensively be modified to overcome this inadequacy.

The solution often heretobefore incorporated was to incorporate an additional set of large thruster rockets, in addition to the small set. The smaller set would be used to maneuver the STV up to the docking position and would then be supplemented by the second, larger, set of thrusters to meet the needs of the system once it is docked with a payload. Not only are the thrusters themselves very expensive, but when a second set of thrusters is incorporated, the system becomes substantially more complex. Further, the overall weight and size of the STV is prohibitively increased.

When the STV docks with a payload, the control system must now deal with increased weight and a new center of gravity for the STV payload. For sufficiently large payloads, the new center of gravity of the STV and attached payload moves to a point outside the STV. Accordingly, the center of gravity is no longer enclosed by the reaction control system, and the thrusters produce undesired rotational torques when translation perpendicular to the payload is commanded. This will, in turn, necessitate the firing of rotational thrusters to counterbalance this torque. This effect, along with the increased weight and inertia of the combined vehicles, necessitates a larger thruster size to provide minimum control. However, as discussed above, a larger thruster size will violate the maximum acceleration constraints when the STV is without a payload, and will result in instability.

The result of this conflict is that the nominal space transfer vehicle configuration cannot satisfy the requirements for maneuvering both with and without a payload. Various solutions to this problem have been suggested heretobefore. For example, as discussed above, one solution is to complement the thrusters of the nominal configuration with additional thrusters of varying sizes, making the minimum number of thrusters required for 6 DOF maneuvering 48. A second solution is to attach an independent thruster module to the end of the payload opposite the STV. A third solution would be to replace the thrusters of the nominal configurations with throttleable thrusters.

None of these solutions is, however, without its problems. Incorporating additional thrusters or providing an independent thruster module would require the implementation of both complex and cost prohibitive modifications. Modifying the nominal configuration to include throttleable thrusters would currently increase the thruster cost by at least a magnitude of ten. Further, none of the solutions heretobefore suggested provide the flexibility to meet the control limits of the STV guidance, navigation and control system with and without a payload, incorporating a single thruster size throughout and utilizing a minimum number of thrusters.

Accordingly, it is desired to provide a thruster arrangement for a space transfer vehicle able to control the vehicle through six degree of freedom maneuvering with and without a payload, incorporating a single thruster size throughout and utilizing a minimum number of thrusters.

Generally, in one embodiment, the present invention provides a space transfer vehicle for producing torque about pitch and yaw axes with a first magnitude for maneuvering without a payload and a second magnitude for maneuvering with a payload. The STV has a longitudinal axis coincident with the roll axis, a front end and an aft end. The STV includes a plurality of substantially identical, non-throttleable thrusters, and control means, in the form of a conventional guidance, navigation and control system, for selectively energizing two thrusters simultaneously to produce a resultant torque. The vehicle arrangement includes a plurality of thruster pods equally spaced relative to each other about the roll axis. A plurality of thrusters is mounted in each of the plurality of thruster pods.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
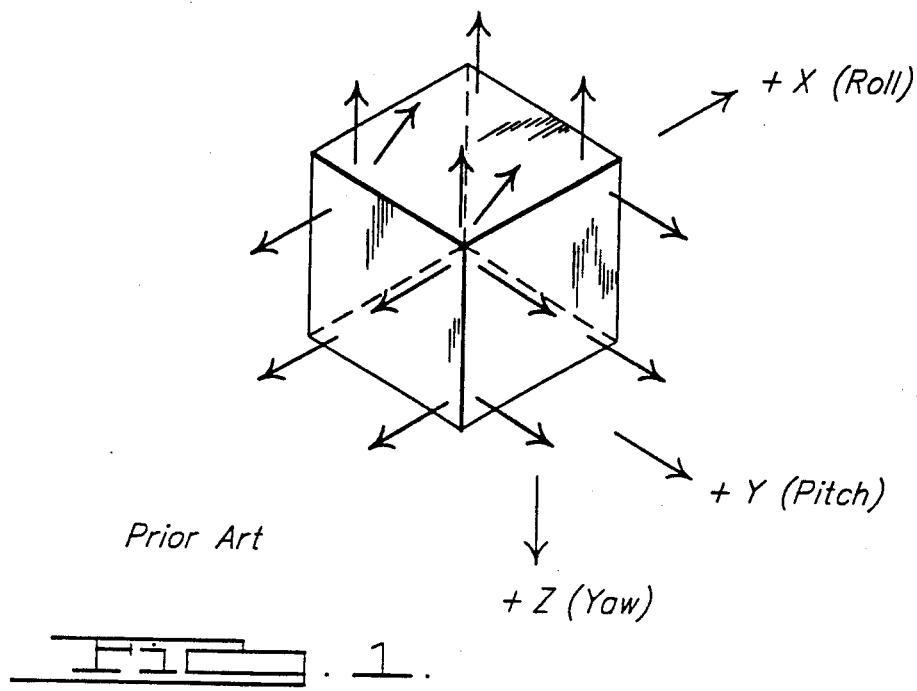
FIG. 1 is a prior art isometric sketch of the nominal thruster configuration for a space transfer vehicle, which is conventional in the industry.
Figure 2:
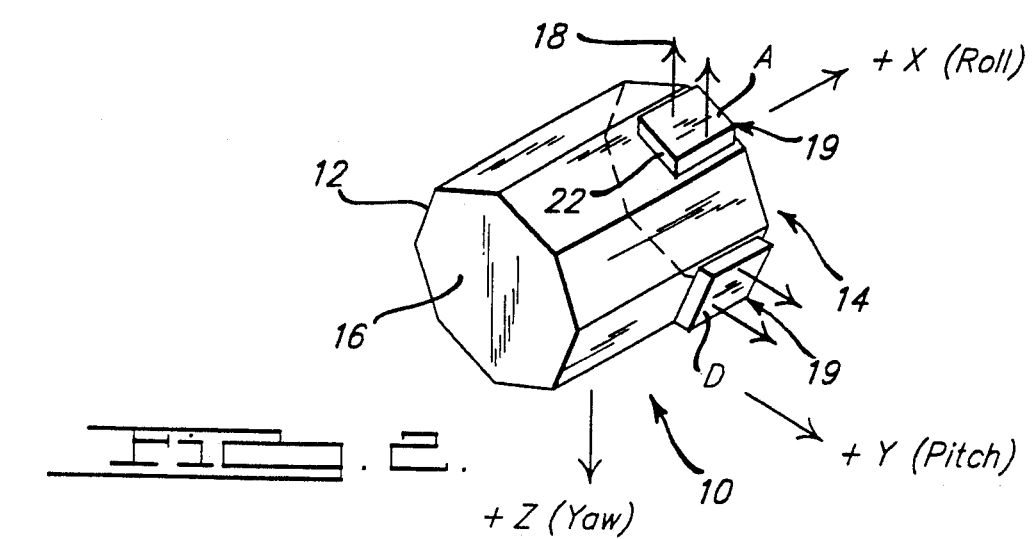
FIG. 2 is a space transfer vehicle incorporating the thruster modules of the present invention.

Referring to FIG. 2, illustrated is a typical space transfer vehicle 10 having an outer shape 12 with a generally cylindrical periphery. The exemplary embodiment illustrated incorporates a conventional space transfer vehicle 10 which has an octagonal cross section, and thereby utilizes a major portion of the maximum available volume allowed by a launch vehicle (not shown), while providing linear faces to which thrusters can be attached. The STV 10 further includes front 14 and aft 16 generally circular faces which are correspondingly octagonal in shape. The front 14 is adapted in a manner well known in the art to be docked with a payload. The STV 10 is assumed to be in orbit and oriented such that the three orthogonal axes (the pitch axis (Y), the roll axis (X), and the yaw axis (Z)) are as shown in FIG. 2.

FIG. 2 further illustrates a plurality of thrusters, cumulatively designated with reference numeral 18, mounted to the generally cylindrical periphery of the outer shape 12 of the space maneuvering vehicle 10. In the preferred embodiment, the thrusters 18 are mounted in four thruster modules, cumulatively designated with reference numeral 19, which are equally spaced about the roll axis. The thrusters 18 are equally divided among the thruster modules 19.

As shown in FIG. 2, the STV 10 is oriented such that the positive yaw axis (+Z) is pointing towards the earth, the positive roll axis (+X) is pointing in the direction of the velocity vector of the STV in the orbit, and the pitch axis (Y) is perpendicular to the orbit normal. As shown, for example, in FIG. 2, the yaw, roll and pitch axes pass through the center of mass of the STV 10. These axes, pitch (Y), yaw (Z) and roll (X), can be considered the primary control axes of the STV 10.

In the STV 10 illustrated four thruster modules 19 are incorporated to control the STV 10 with respect to the pitch (Y), yaw (Z) and roll (X) axes. The individual thruster modules are identified with reference letters A, B, C, and D. As shown in front view, FIG. 3, thruster module A is located on the top of the STV 10 and thruster modules B, C, and D are equidistantly disposed clockwise about the outer surface 12 of the STV 10. Thus, module B is on the left side, module C is opposite A, and module D is on the right side. Each thruster module 19 is box-like in shape and includes a front side 20, a rear side 22, left and right laterally opposing sides 24, 26 and a top 28. In the preferred embodiment, the thruster modules 19 are mounted to the STV 10 adjacent the front docking end 14, which places them as close as possible to a combined center of gravity when the STV 10 is docked with a large payload.

The reference numerals of the individual thrusters 18 of the present invention further incorporate one of these letters, thereby designating the module 19 in which the thruster 18 is mounted. Thus, for example, thrusters A1 through A6 are mounted in thruster module A.

Turning next to FIGS. 4a through 4d, illustrated are the top, left side, right side, and bottom views of the preferred embodiment of the present invention depicting the arrangement of thrusters 18 for the control of the position and attitude of the STV 10. It should be appreciated that full description of one thruster module 19 is sufficient given the identical arrangement of thrusters 18 in each module 19. The preferred embodiment of the present invention incorporates twenty-four (24) substantially identical non-throttleable thrusters 18. Most commonly, the thrusters 18 are conventional thrusters ranging in size from 25 to 50 pounds but can be scaled over almost any range. It will be appreciated by those skilled in the art that the thruster size will depend upon multiple variables including the size of the STV 10 and the size of the payload.

The thrusters 18 of each thruster module 19 are arranged in a pinwheel formation in order to solve the small couple/large couple problem for pitch and yaw maneuvering by providing long and short moment arms and multiple thrust level options, which will be described in greater detail hereinafter. The pinwheel arrangement is achieved by mounting one thruster 18 in each of the front 20, back 22 and laterally opposing sides 24, 26 of each thruster module A, B, C, and D. In particular, thruster A1 is mounted in the rear side 22 of thruster module A, thruster A2 is mounted in the right side 26, thruster A3 is mounted in the front side 20 and thruster A4 is mounted in the left side 24. Each of these thrusters 18 is disposed so as to produce an axis of thrust perpendicular to the side in which the particular thruster 18 is mounted. The thrusters 18 of opposing sides are mounted in opposing corners, thereby producing a torque couple when simultaneously energized, the importance of which will become more apparent below.

The mounting of thrusters A1 through A4 as illustrated, in combination with an identical mounting arrangement in thruster modules B, C, and D, provides all necessary maneuvering capabilities about the pitch (Y) and yaw (Z) axes. The thrusters 18 are concomitantly fired in predetermined pairs to produce the desired maneuver. Table I, below, lists the particular pairs of thrusters 18 necessary for all possible pitch (Y) and yaw (Z) maneuvers. The significance of being able to complete each maneuver with two differing degrees of torque, large and small, is important since the STV 10 is required to operate with acceleration limits with and without a payload. The maneuvering of the STV 10 is described in detail below.

TABLE I

| TORQUE | THRUSTER COMBINATION |
|---|---|
| Pitch: (Y axis rotation) | |
| Positive large couple | A3 & C1 |
| Positive small couple | D1 & D3 or D2 & D4 |
| Negative large couple | A1 & C3 |
| Negative small couple | B1 & B3 or B2 & B4 |
| Yaw: (Z axis rotation) | |
| Positive large couple | B1 & D3 |
| Positive small couple | C1 & C3 or C2 & C4 |
| Negative large couple | B3 & D1 |
| Negative small couple | A1 & A3 or A2 & A4 |

Maneuvers about the roll axis (X) are enabled by further providing two thrusters, each mounted in the top surface 28 along a single plane. Each thruster produces a line of thrust perpendicular to and slightly offset from the roll axis. In module A, the roll thrusters are designated A5 and A6. Table II, below lists the particular pairs of thrusters necessary to produce all of the possible maneuvers about the roll (X) axis.

TABLE II

| TORQUE | THRUSTER COMBINATION |
|---|---|
| Roll: (X axis rotation) | |
| Positive large couple | A4 & C4 or B4 & D4 |
| Positive small couple | A5 & C5 or B5 & D5 |
| Negative large couple | A2 & C2 or B2 & D2 |
| Negative small couple | A6 & C6 or B6 & D6 |

Accordingly, as indicated in Tables I and II, above, the preferred embodiment of the present invention provides a minimum thruster configuration having a great amount of redundancy, but not being fully redundant. That is, if a single thruster 18 were to fail, most of the maneuvers required, but not all, could still be accomplished.

Turning to FIGS. 5a-5d, illustrated are the top, left side, bottom and right side view of the STV of FIG. 2 incorporating an alternative embodiment of the arrangement of thrusters 18 of the present invention. In the alternative embodiment, a fully redundant system is provided by incorporating an additional thruster A7 and A8 in each module 19. Full thruster redundancy allows any single thruster 18 to be eliminated due to failure while retaining full 6 DOF control capability in both large and small couple mode. If any two thrusters 18 are simultaneously failed, the worst case is that 4 DOF capability will be retained so that the STV can be maneuvered safely away from a space station. Most two thruster failures will result in no more degradation than a single thruster failure, and full 6 DOF capability will still be retained. The additional thruster A7 would be mounted in the front side of each module to produce a thruster line of axis substantially coincident with thruster A1, but opposite in direction. The additional thruster A8 would be mounted in the rear side of each module to produce a thrust line of axis substantially coincident with thruster A3, but opposite in direction.

In operation, each thruster pair listed in Tables I and II produces a rotational torque couple which is defined as the cross product of the thrust force with the moment arm (distance) of the midpoint between the two thruster axes. Control means, in the form of a conventional guidance, navigation and control system (not shown) operates to selectively energize the thrusters 18. In operation, in order to accomplish rotational maneuvers, the thrusters 18 are ideally fired in balanced pairs to produce pure rotation. Balanced pairs occur when the thruster reaction line of thrust are parallel, opposite in direction, and reside within a single thrust plane which is perpendicular to the particular primary control axis about which rotation is desired. The degree of torque produced depends upon moment arm between the parallel thrust axes of the particular balanced pair fired. The amount of angular impulse produced can be varied by altering the amount of time which the thrusters 18 are energized.

Only the maneuvers about the pitch (Y) axis will be discussed in detail, with the remaining maneuvers set forth above in Tables I and II. Due to the symmetry of the thruster configuration, the remaining maneuvers will become apparent, with multiple thruster choices possible for each, thereby providing generous redundancy capability.

For example, if pitch (Y) maneuvers are desired with the preferred embodiment, a balanced thruster pair would include two thrusters 18 each having reaction lines of thrust which define a thrust plane that is perpendicular to the pitch (+Y) axis, are parallel and opposite in direction. The particular combinations meeting this criteria include A3 and C1, D1 and D3, D2 and D4, A1 and C3, B1 and B3, and B2 and B4. The first three combinations produce positive pitch (+Y) rotation, while the last three combinations produce a negative (−Y) pitch rotation.

Figure 3:
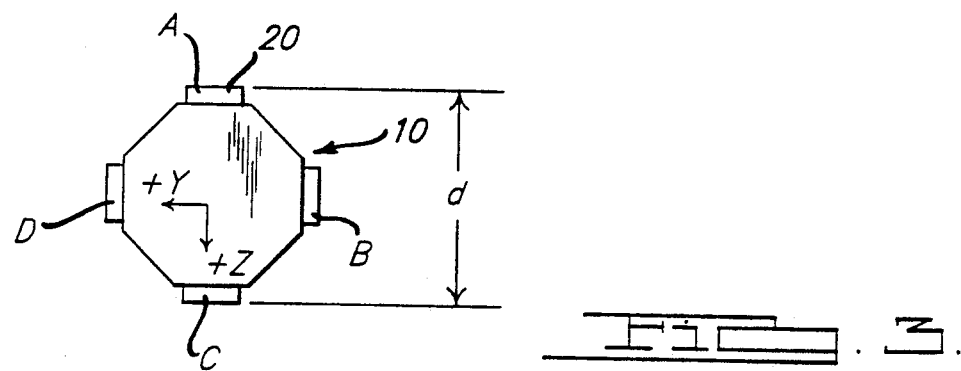
FIG. 3 is a front end view of the STV of FIG. 2.
Figure 4A:
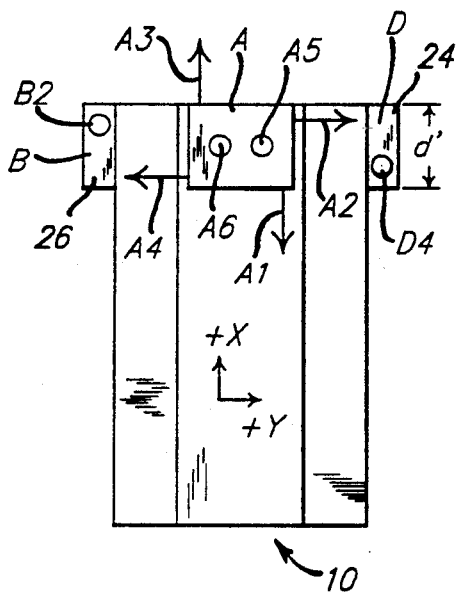
FIGS. 4a-4d are top (4a), left side (4b), bottom (4c) and right side (4d) views of the STV of FIG. 2 further identifying the thruster configuration of the preferred embodiment of the present invention.
Figure 4B:
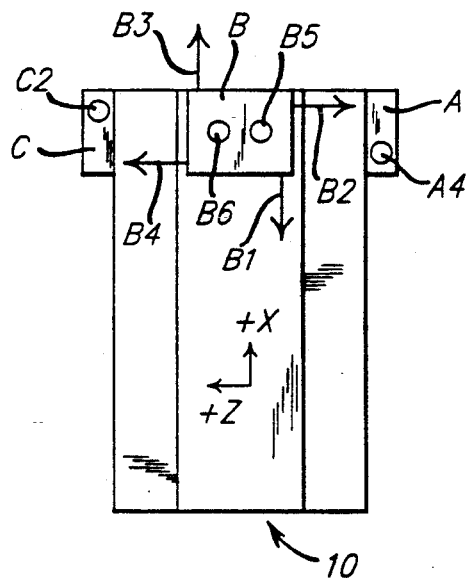
Figure 4C:
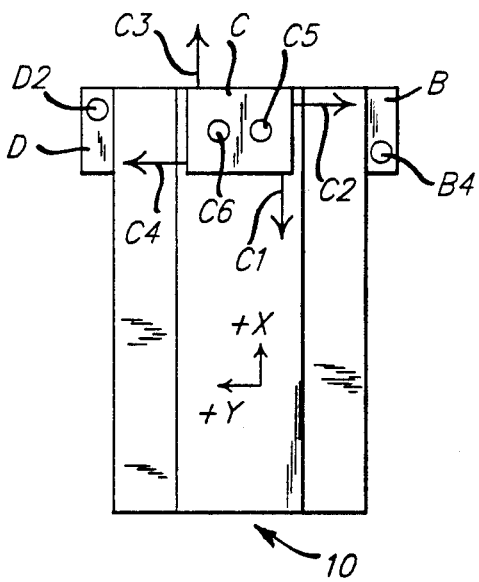
Figure 4D:
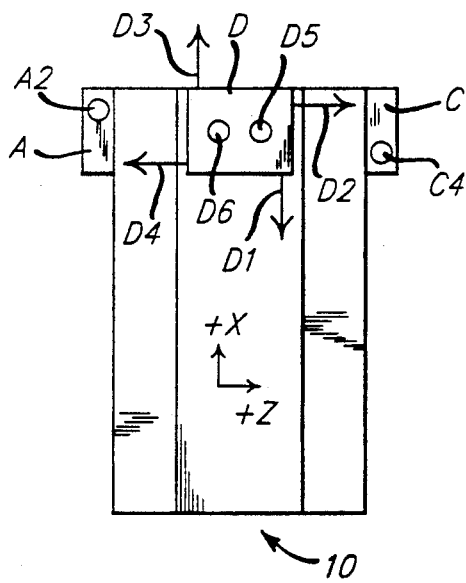
Figure 5A:
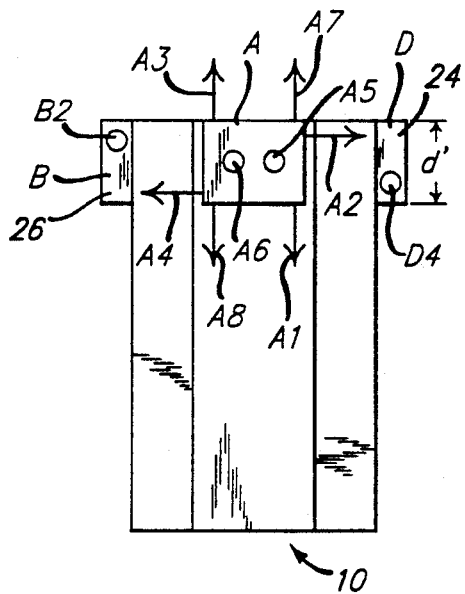
FIGS. 5a-5d are top (5a), left side (5b), bottom (5c) and right side (5d) views of the STV of FIG. 2, further identifying the thruster configuration of an alternative embodiment of the present invention.
Figure 5B:
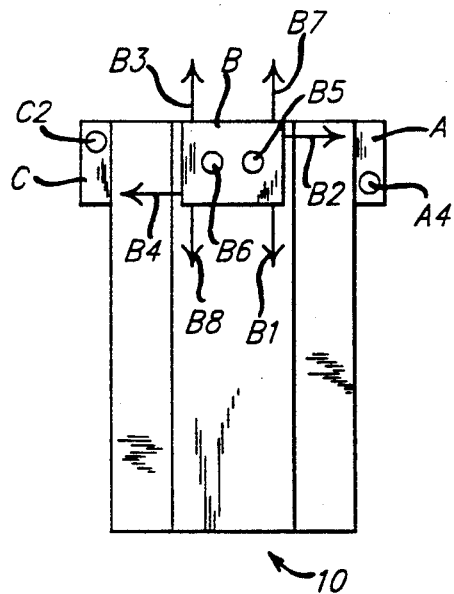
Figure 5C:
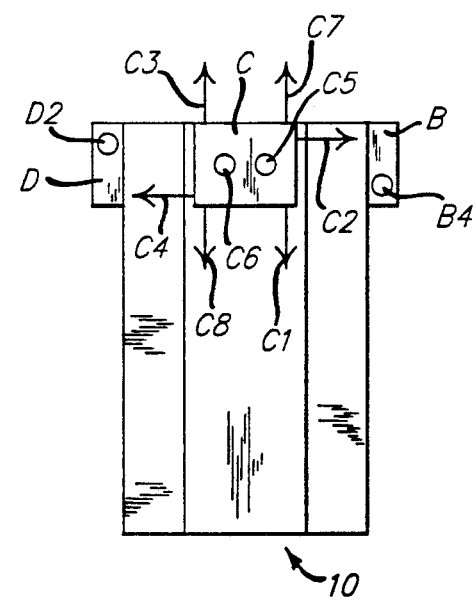
Figure 5D:
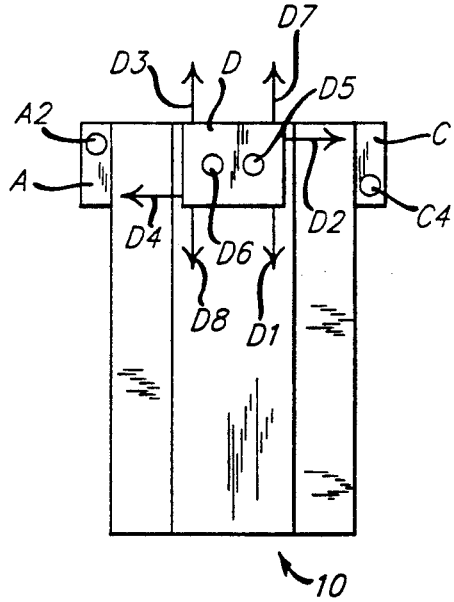

Referring to FIGS. 3 and 4a, the magnitude of resultant torque is controlled by the moment arm between the thruster axis of the thrusters of a particular pair. Thus, for positive pitch (+Y), a first, larger, moment arm d exists between thrusters A3 and C1, while a second, smaller moment arm d exists between D1 and D3 and D2 and D4. The shorter moment arm d' is approximately the distance across the thruster module D, while the larger moment arm d is approximately the diameter of the STV 10.

In order to remain with the specific operating limits of maximum and minimum rotational acceleration of the guidance, navigation and control system, the balanced pair of A3 and C1 would be fired for positive pitch (+Y) rotation when a payload was attached, while D1 and D3 or D2 and D4 would be fired to maneuver the STV 10 without a payload.

Positive and negative yaw and roll maneuvers are accomplished in a similar manner about the yaw (Z) and roll (X) axes, respectively.

It will be understood by those skilled in the art, that a thruster combination wherein the thrusters 18 have reaction lines of thrust which are parallel and opposite in direction, but which do not lie in a single thruster plane which is perpendicular to the axis about which rotation is desired, will produce a torque which is not pure. Such a torque would require a compensating torque for proper maneuvering of the STV 10.

Translational maneuvering is executed along the three primary control axes of the STV 10, in both the positive and negative direction. Ideally, the combined center of gravity, with or without a payload, is located on the primary control axes along which translation is desired. If this condition exists, translation of the STV 10 is accomplished by firing two thrusters 18 having reaction lines of thrust which are equidistantly spaced from and in the same plane as the control axes along which translation is desired. For example, if translation is desired in the +X direction, each thruster 18 of the thruster pair would have a reaction line of thrust parallel to the +X axis and each reaction line of thrust would be in a single plane along with the +X axis. Thus, for translation in the +X direction two thruster pairs are available, namely, A1 and C1 and B1 and D1. The remaining combinations possible for the other various translational maneuvers are set forth below in Table III.

TABLE III

| TRANSLATION | THRUSTERS |
|---|---|
| Positive X | A1 & C1 or B1 & D1 |
| Negative X | A3 & C3 or B3 & D3 |
| Positive Y | A4 & C2 or B5 & B6 |
| Negative Y | A2 & C4 or D5 & D6 |
| Positive Z | B2 & D4 or A5 & A6 |
| Negative Z | B4 & D2 or C5 & C6 |

It will be appreciated by those skilled in the art that in actuality, the combined center of gravity is usually not located on the primary control axis along which translation is desired. If the center of gravity is not along the axis, a disturbance torque will result which must be nulled by a rotational control torque.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A space transfer vehicle having a front end and an aft end and having pitch, roll, and yaw axes, and a longitudinal axis coincident with the roll axis, the pitch and yaw axes being generally symmetrical with the geometry of the space transfer vehicle, the space transfer vehicle being operative for maneuvering both with and without a payload and comprising:

means for maneuvering said space transfer vehicle negatively and positively about said pitch and yaw axes, said means for maneuvering being operative in a first mode when said space transfer vehicle is attached to a payload and a second mode when said space transfer vehicle is operated independently from a payload, said means for maneuvering comprising a plurality of substantially identical, non-throttable thrusters, said thrusters being operative to be fired in pairs to produce a desired torque; and control means operable for selectively energizing a pair of said substantially identical thrusters simultaneously to selectively produce a pair of parallel axes of thrust, thereby resulting in said desired torques;

wherein said pair of parallel axes of thrust are spaced apart a first distance when said means for maneuvering is in said first mode, and a second distance when said means for maneuvering is in said second mode, said first distance being greater than said second distance.

2. The space transfer vehicle of claim 1 wherein the thrusters are arranged into four groups, each group having an identical plurality of thrusters.

3. The space transfer vehicle of claim 2 wherein the thruster groups are circumferentially disposed on the outer surface and equally spaced apart relative to the roll axis.

4. The space transfer vehicle of claim 3 wherein the thruster groups are mounted substantially adjacent the front end.

5. The space transfer vehicle of claim 4 wherein a first and second thruster of each thruster group being mounted to generate, when energized, first and second reaction lines of thrust parallel to said roll axis, respectively, said first and second reaction lines of thrust being spaced apart, parallel and opposite in direction; and a third and fourth thruster of each thruster group being mounted to generate, when energized, third and fourth reaction lines of thrust perpendicular to said roll axis, respectively, said third and fourth reaction lines of thrust being spaced apart, parallel and opposite in direction.

6. The space transfer vehicle of claim 5 wherein said control means is further operable to selectively energize two or more thrusters simultaneously to produce first and second roll torques about said roll axis, said first and second roll torques being substantially equal in magnitude and opposite in direction.

7. The space transfer vehicle of claim 6 wherein:

a fifth and a sixth thruster of each thrust group mounted to generate, when energized, fifth and sixth reaction lines of thrust, respectively, said fifth and sixth reaction lines of thrust being perpendicular to said first, second, third and fourth reaction lines of thrust.

8. A space transfer vehicle for maneuvering with respect to pitch, yaw and roll axes, having a longitudinal axis coincident with the roll axis, an outer surface substantially symmetrical about the pitch and yaw axes, a front end and an aft end, the space transfer vehicle comprising:

a plurality of substantially identical non-throttleable thrusters;

control means operable to selectively energize two or more substantially identical non-throttleable thrusters simultaneously to thereby produce first, second, third and fourth pitch torques about said pitch axes, and first, second, third and fourth yaw torques about said yaw axis;

said first and second pitch torques each having a first magnitude, and being opposite in direction;

said third and fourth pitch torques each having a second magnitude, and being opposite in direction, said second magnitude being different than said first magnitude;

said first and second yaw torques each having a third magnitude, and being opposite in direction; and said third and fourth yaw torques each having a fourth magnitude, and being opposite in direction, said third magnitude being different than said fourth magnitude.

9. The space transfer vehicle of claim 8 wherein the thrusters are arranged into four groups, each group having an identical plurality of thrusters.

10. The space transfer vehicle of claim 9 wherein the thruster groups are circumferentially disposed on the outer surface and equally spaced apart relative to the roll axis.

11. The space transfer vehicle of claim 10 wherein the thruster groups are mounted adjacent the front end face.

12. The space transfer vehicle of claim 11 wherein a first and second thruster of each thruster group is mounted to generate, when energized, first and second reaction lines of thrust parallel to said roll axis, respectively;
   said first and second reaction lines of thrust being spaced apart, parallel and opposite in direction; and
   a third and fourth thruster of each thruster group being mounted to generate, when actuated, third and fourth reaction lines of thruster perpendicular to said roll axis, respectively, said third and fourth reaction lines of thrust being spaced apart, parallel and opposite in direction.

13. The space transfer vehicle of claim 12 wherein said control means is further operable to selectively energize two or more thrusters simultaneously to produce first and second roll torques about said roll axis, said first and second roll torques being equal in magnitude and opposite in direction.

14. The space transfer vehicle of claim 13 further including:
   a fifth and a sixth thruster of each thrust group mounted to generate, when energized, fifth and sixth reaction lines of thrust, respectively, said fifth and sixth lines of thrust being perpendicular to said first, second, third and fourth lines of thrust.

15. A space transfer vehicle having a front end and an aft end and having pitch, roll and yaw axes, the space transfer vehicle having a longitudinal axis coincident with the roll axis, and an outer surface substantially symmetrical about the pitch and yaw axis, the space transfer vehicle comprising:
   a plurality of box-like thruster modules having first and second laterally spaced apart sides, a front side, a rear side and a top;
   a plurality of thrusters mounted in each of said plurality of thruster modules; and
   control means operable for selectively energizing at least two thruster simultaneously to thereby selectively produce negative and positive pitch torques of first and second magnitudes, said first magnitude being different from said second magnitude, and negative and positive yaw torques of third and fourth magnitudes, said third magnitude being different than said fourth magnitude.

16. The system of claim 15 wherein there are four box-like thruster modules, said box-like thruster modules being circumferentially disposed about the outer surface, adjacent the front end and equally spaced apart relative to the roll axis.

17. The system of claim 16 wherein first and second thrusters are mounted in each thruster module to generate, when energized, first and second reaction lines of thrust parallel to said roll axis, respectively, said first and second reaction lines of thrust being spaced apart, parallel and opposite in direction; and
   a third and fourth thruster is mounted in each thruster module to generate, when energized, third and fourth reaction lines of thrust perpendicular to said roll axis, respectively, said third and fourth reaction lines of thrust being spaced apart, parallel and opposite in direction.

18. The space transfer vehicle of claim 17 wherein the space transfer vehicle further produces torque about the roll axis with said first magnitude and said second magnitude, and said space transfer vehicle further comprises:
   a fifth and sixth thruster mounted in each thruster module to generate, when energized, fifth and sixth reaction lines of thrust, respectively, said fifth and sixth reaction lines of thrust being perpendicular to said first, second, third and fourth reaction lines of thrust.

19. The space transfer vehicle of claim 18 further including:
   a seventh thruster mounted in each thruster module to generate, when energized, a seventh line of thrust, said seventh line of thrust being opposite in direction to and substantially coincident with said first line of thrust; and
   an eighth thruster mounted in each thruster module to generate, when energized, an eighth line of thrust, said eighth line of thrust being opposite in direction to and substantially coincident with said third line of thrust.

* * * * *